United States Patent
Khoshnevis et al.

(10) Patent No.: US 8,983,391 B2
(45) Date of Patent: Mar. 17, 2015

(54) SIGNALING POWER ALLOCATION PARAMETERS FOR UPLINK COORDINATED MULTIPOINT (COMP)

(75) Inventors: Ahmad Khoshnevis, Portland, OR (US); Shohei Yamada, Camas, WA (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 480 days.

(21) Appl. No.: 13/209,335

(22) Filed: Aug. 12, 2011

(65) Prior Publication Data
US 2013/0040578 A1   Feb. 14, 2013

(51) Int. Cl.
H04B 17/00 (2006.01)
H04W 52/24 (2009.01)
H04W 52/14 (2009.01)

(52) U.S. Cl.
CPC ......... H04W 52/242 (2013.01); H04B 17/0045 (2013.01); H04W 52/146 (2013.01)
USPC ................... 455/67.11; 455/515; 370/330

(58) Field of Classification Search
CPC ........... H04B 17/0045; H04W 52/146; H04W 52/242
See application file for complete search history.

(56) References Cited

U.S. PATENT DOCUMENTS

| | | | |
|---|---|---|---|
| 2009/0279495 A1* | 11/2009 | Yoo | 370/329 |
| 2010/0137017 A1 | 6/2010 | Lin et al. | |
| 2011/0103343 A1* | 5/2011 | Nishio et al. | 370/330 |
| 2011/0105170 A1 | 5/2011 | Gan et al. | |
| 2011/0164555 A1 | 7/2011 | Yim et al. | |
| 2011/0171992 A1 | 7/2011 | Seo et al. | |
| 2012/0009923 A1* | 1/2012 | Chen et al. | 455/434 |
| 2012/0044818 A1* | 2/2012 | Lindoff et al. | 370/252 |
| 2012/0076042 A1* | 3/2012 | Chun et al. | 370/252 |
| 2012/0269151 A1* | 10/2012 | Lee et al. | 370/329 |
| 2012/0282964 A1* | 11/2012 | Xiao et al. | 455/515 |
| 2012/0294254 A1* | 11/2012 | Behravan et al. | 370/329 |

FOREIGN PATENT DOCUMENTS

| | | |
|---|---|---|
| EP | 2445260 | 4/2012 |
| WO | 2009/136706 | 11/2009 |
| WO | 2010/081166 A2 | 7/2010 |
| WO | 2010/146781 | 12/2010 |

OTHER PUBLICATIONS

3GPP TS 36.331 V8.6.0, Jun. 2009.*
3GPP TS 36.331 V9.3.0, Jun. 2009.*
3GPP TS 36.331 V10.2.0, "Evolved Universal Terrestrial Radio Access (E-UTRA); Radio Resource Control (RRC); Protocol Specification (Release 10)," Jun. 2011.

(Continued)

Primary Examiner — Fayyaz Alam
Assistant Examiner — Mohammed Rachedine
(74) Attorney, Agent, or Firm — Keating & Bennett, LLP

(57) ABSTRACT

A method for obtaining multiple path loss parameters by a user equipment (UE) is described. A radio resource control (RRC) signaling message is received from a serving eNode B. A first transmit power corresponding to a first reference signal is obtained from the RRC signaling message. A second transmit power corresponding to a second reference signal is obtained from the RRC signaling message. A first path loss parameter is calculated using the first transmit power. A second path loss parameter is calculated using the second transmit power.

4 Claims, 12 Drawing Sheets

(56) References Cited

OTHER PUBLICATIONS

3GPP TS 36.213 V10.2.0, "Evolved Universal Terrestrial Radio Access (E-UTRA); Physical Layer Procedures (Release 10)," Jun. 2011.
3GPP TR 36.819 V 1.0.0, "Coordinated Multi-Point Operation for LTE Physical Layer Aspects (Release 11)," May 2011.
3GPP TS 36.211 V10.2.0, "Evolved Universal Terrestrial Radio Access (E-UTRA); Physical Channels and Modulation (Release 10)," Jun. 2011.
Written Opinion issued for International Patent Application No. PCT/JP2012/005127 on Mar. 19, 2013.
3GPP TS 36.331 V10.2.0 Evolved Universal Terrestrial Radio Access (E-UTRA); Radio Resource Control (RRC); Protocol specification (Release10), Jun. 2011.
3GPP TSG-RAN WG1 #65, "Uplink Power Control Discussion for CoMP Scenario 4", R1-111598, May 9-13, 2011, Barcelona, Spain.
International Search Report issued for International Patent Application No. PCT/JP2012/005127 on Sep. 11, 2012.

\* cited by examiner

US 8,983,391 B2

SIGNALING POWER ALLOCATION PARAMETERS FOR UPLINK COORDINATED MULTIPOINT (COMP)

TECHNICAL FIELD

The present invention relates generally to wireless communications and wireless communications-related technology. More specifically, the present invention relates to systems and methods for signaling power allocation parameters for uplink coordinated multipoint (CoMP).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve both the efficiency and quality of wireless communications. For example, a wireless communication device may report uplink control information (UCI) to a base station. This uplink control information (UCI) may be used by the base station to select appropriate transmission modes, transmission schemes and modulation and coding schemes for downlink transmissions to the wireless communication device.

The use of coordinated multipoint (CoMP) is considered a major enhancement to Long Term Evolution (LTE) Release 11. Benefits may be realized by improvements to the use of coordinated multipoint (CoMP).

DETAILED DESCRIPTION

Figure 1:
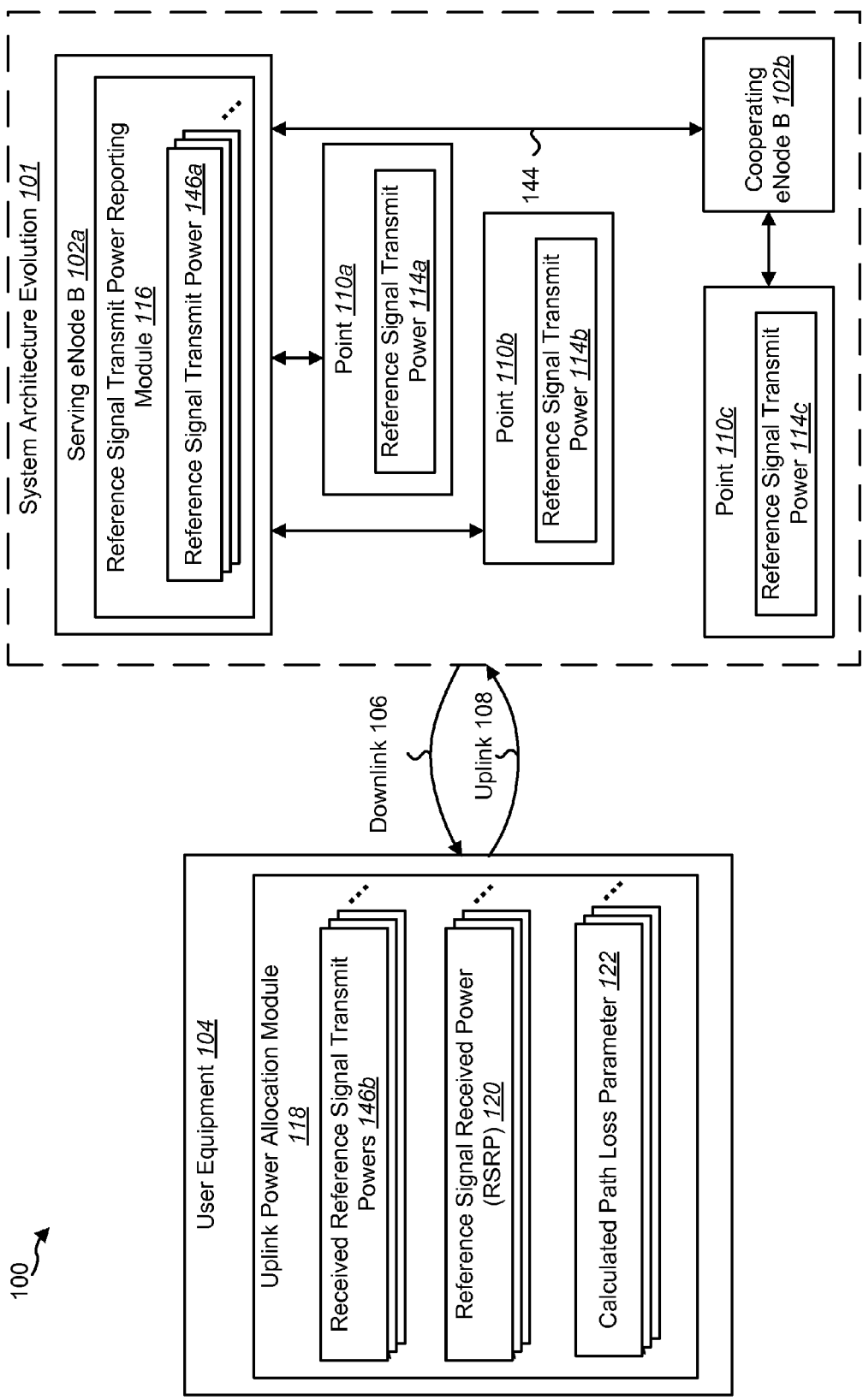
FIG. 1 is a block diagram illustrating a wireless communication system that may utilize coordinated multipoint (CoMP)

A method for obtaining multiple path loss parameters by a user equipment (UE) is described. A radio resource control (RRC) signaling message is received from a serving eNode B. A first transmit power corresponding to a first reference signal is obtained from the RRC signaling message. A second transmit power corresponding to a second reference signal is obtained from the RRC signaling message. A first path loss parameter is calculated using the first transmit power. A second path loss parameter is calculated using the second transmit power.

The first reference signal may be a first cell-specific reference signal. The second reference signal may be a second cell-specific reference signal. The second reference signal may instead be a channel state information reference signal (CSI-RS). The CSI-RS may be in a PDSCH configuration. The PDSCH configuration may include two CSI-RS configurations. The PDSCH configuration may include more than two CSI-RS configurations.

A first received power of the first reference signal may be measured. The first received power may be used to calculate the first path loss parameter. A second received power of the second reference signal may also be measured. The second received power may be used to calculate the second path loss parameter. The second reference signal may be transmitted by an antenna port. The antenna port may include a transmission point. The first received power and the second received power may be reference signal received powers (RSRPs).

An uplink power allocation of multipoint reception may be determined using the first path loss parameter and the second path loss parameter. The first reference signal may be transmitted by a first antenna port. The second reference signal may be transmitted by a second antenna port. The first path loss parameter may correspond to a communication link between the first antenna port and the UE. The second path loss parameter may correspond to a communication link between the second antenna port and the UE.

A user equipment (UE) configured for obtaining multiple path loss parameters is also described. The user equipment (UE) includes a processor, memory in electronic communication with the processor and instructions stored in the memory. The instructions are executable by the processor to receive a radio resource control (RRC) signaling message from a serving eNode B. The instructions are also executable by the processor to obtain a first transmit power corresponding to a first reference signal from the RRC signaling message. The instructions are further executable by the processor to obtain a second transmit power corresponding to a second reference signal from the RRC signaling message. The instructions are also executable by the processor to calculate a first path loss parameter using the first transmit power. The instructions are further executable by the processor to calculate a second path loss parameter using the second transmit power.

A method for signaling power allocation parameters by a serving eNode B is described. A radio resource control (RRC) signaling message that includes a first reference signal transmit power and a second reference signal transmit power is generated. The RRC signaling message is sent to a user equipment (UE).

The second reference signal transmit power may be received from a cooperating eNode B. The first reference signal may be a first cell-specific reference signal. The first reference signal may be transmitted by a first antenna port. The second reference signal may be transmitted by a second antenna port. The first antenna port may include a first reception point. The second antenna port may include a second reception point.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9, Release-10 and Release-11). However, the scope of the present disclosure should not be limited in this regard. At least some aspects of the systems and methods disclosed herein may be utilized in other types of wireless communication systems.

In LTE Release-11, the use of coordinated multipoint (CoMP) transmission and reception are major enhancements. In coordinated multipoint (CoMP) transmission, a user equipment (UE) may be able to receive downlink signals from multiple geographically separated antennas (referred to herein as points). A point may be a set of geographically co-located antennas. A point may also be referred to as a site. Points may be located on or connected to the same base station or different base stations. Furthermore, uplink transmissions by the user equipment (UE) may be received by multiple points. Those points that transmit on the downlink to the user equipment (UE) may be referred to as transmission points. Those points that receive transmissions on the uplink from a user equipment (UE) may be referred to as reception points.

A point may be capable of both transmission and reception. In general, "point" refers to both transmission points and reception points. It is not necessary to use the same set of points for transmission to and reception from a given user equipment (UE). It is possible that a subset of points participating in downlink transmission (to a user equipment (UE)) may be the same as or different than a subset of points participating in uplink reception (from the user equipment (UE)). Sectors of the same site may correspond to different points. A set of points that are involved in downlink transmission or uplink reception may change from one subframe to another. A user equipment (UE) may receive the physical broadcast channel (PBCH) from one point or a set of points that are referred to as the serving point(s). The serving point may be the serving cell of Rel-8.

A user equipment (UE) may also receive UE-specific controls from a point or set of points referred to as the control signaling point(s). The control signaling point may be the serving cell of Rel-8. The points used for physical downlink shared channel (PDSCH) transmissions to a specific user equipment (UE) may or may not be the same as the serving point(s) and control signaling point(s) for the user equipment (UE). The set of control signaling points and the set of serving points refer to different sets of points. There may be some points that are in both the set of control signaling points and the set of serving points.

By coordinating the downlink transmissions from each point to the user equipment (UE), the downlink performance can be significantly increased. Likewise, by coordinating the uplink reception at multiple reception points, significant improvement in the uplink performance can be achieved. In coordinated multipoint (CoMP) transmissions, the channel state information (CSI) of each coordinated cell may be reported separately or jointly with the same format as Release-10 or new formats.

The use of coordinated multipoint (CoMP) transmission and/or reception may increase uplink and downlink data transmission rates while ensuring consistent service quality and throughput on LTE wireless broadband networks and 3G networks. Coordinated multipoint (CoMP) transmission and/or reception may be used on both the uplink and the downlink.

FIG. 1 is a block diagram illustrating a wireless communication system 100 that may utilize coordinated multipoint (CoMP). The wireless communication system 100 may include a serving eNode B 102*a* and a cooperating eNode B 102*b* as part of a system architecture evolution 101. The system architecture evolution 101 is a flat IP-based network architecture designed to replace the GPRS Core Network. In one configuration, the system architecture evolution 101 may be referred to as a core network. An eNode B 102 is a physical structure that may include multiple antennas. Some of the antennas may be co-located with an eNode B 102 and other antennas may be geographically separated from an eNode B 102. Both the co-located antennas and the geographically separated antennas may be referred to as points 110. Some of the points 110*a*-*b* may be associated with the serving eNode B 102*a* while other points 110*c* may be associated with a cooperating eNode B 102*b*. The eNode Bs 102 may use the points 110 to coordinate downlink 106 transmission to and uplink 108 reception from a user equipment (UE) 104. If a point 110*c* is connected to a cooperating eNode B 102*b*, there may be a backhaul interface 144 connecting the cooperating eNode B 102*b* to the serving eNode B 102*a*.

A point 110 may be an antenna associated with a base station. A base station may be referred to as an access point, a Node B, an eNode B or some other terminology. A point 110 may be collocated with a base station or geographically separated from the base station. Likewise, a user equipment (UE) 104 may be referred to as a mobile station, a subscriber station, an access terminal, a remote station, a user terminal, a terminal, a handset, a subscriber unit, a wireless communication device or some other terminology.

Communication between a user equipment (UE) 104 and an eNode B 102 may be accomplished using transmissions over a wireless link, including an uplink 108 and a downlink 106. The uplink 108 refers to communications sent from a user equipment (UE) 104 to a device in the system architecture evolution 101 (i.e., an eNode B 102). The downlink 106 refers to communications sent from the system architecture evolution 101 (i.e., an eNode B 102) to a user equipment (UE) 104. An eNode B 102 may use different combinations of points 110 to send downlink 106 signals to a user equipment (UE) 104 and receive uplink 108 signals from the user equipment (UE) 104.

In general, the communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, a base station may have multiple antennas (or points 110) and a user equipment (UE) 104 may have multiple antennas (not shown). In this way, a base station and a user equipment (UE) 104 may each operate as either a transmitter or a receiver in a MIMO system. One benefit of a MIMO system is improved performance if the additional dimensionalities created by the multiple transmit and receive antennas are utilized.

In 3GPP Release-10 LTE—Advanced, additional control feedback may be sent on control channels to accommodate MIMO and carrier aggregation. Carrier aggregation refers to transmitting data on multiple component carriers (CCs) (or cells) that are contiguously or separately located.

As used herein, a serving point 110 (or set of serving points 110) refers to one or more points 110 that are serving the user equipment (UE) 104 (i.e., by providing the physical broadcast channel (PBCH)). For simplicity, reference is made herein to only a single serving point 110, even though there may be multiple serving points 110. The downlink 106 transmission from multiple points 110 to a single user equipment (UE) 104 may be referred to as coordinated multipoint (CoMP) transmission operation. The uplink 108 transmission from a user equipment (UE) 104 to multiple points 110 may be referred to as coordinated multipoint (CoMP) reception operation.

All points 110 transmitting coordinated multipoint (CoMP) signals to a user equipment (UE) 104 (including the serving point 110) may be referred to as CoMP transmission points 110 or transmission points 110. All points 110 receiving coordinated multipoint (CoMP) signals from a user equipment (UE) 104 may be referred to as CoMP reception points 110 or reception points 110. When a point 110 is used as a reception point 110, the point 110 may transmit a reference signal over the downlink 106 to the user equipment (UE) 104 prior to the user equipment (UE) 104 transmitting uplink 108 signals received by the reception point 110. Each of the points 110 may use a reference signal transmit power 114a-c to transmit the reference signal to the user equipment (UE) 104.

Different types of reference signals may be used by the points 110. For example, points 110 may use cell-specific reference signals (CRS), multimedia broadcast over a single frequency network (MBSFN) reference signals, user equipment (UE)-specific reference signals (e.g., a demodulation reference signal (DM-RS)), positioning reference signals (PRS) and channel state information reference signals (CSI-RS). In Release 10 of 3GPP, there is one reference signal transmitted per downlink 106 antenna port.

An antenna port may be defined such that the channel over which a symbol on the antenna port is conveyed can be inferred from the channel over which another symbol on the same antenna port is conveyed. There may be one resource grid (time-frequency) per antenna port.

The frequency bandwidth may be partitioned in subcarriers with equal bandwidth. The set of subcarriers may be denoted by $SC=\{sc_1, sc_2, \ldots, sc_K\}$. Time may be divided into intervals with equal durations known as the symbol period. In 3GPP Release 8 and later releases, the temporal duration of a time-frequency resource grid is 0.5 milliseconds (ms) (referred to as a slot). The set of time intervals may be denoted by $T=\{T_1, T_2, \ldots, T_L\}$. The frequency-time resource grid may then be defined as the Cartesian product of $SC \times T = \{(sc_k, T_l), k=1, \ldots, K$ and $l=1, \ldots, L\}$.

The points 110 participating in the transmission of reference signals to the user equipment (UE) 104 may belong to the coordinated multipoint (CoMP) measurement set. The coordinated multipoint (CoMP) measurement set may be defined as the set of points 110 about which channel state/statistical information related to their link to the user equipment (UE) 104 is measured and/or reported. The transmission of reference signals in the downlink 106 may or may not occur in a coordinated multipoint (CoMP) transmission setting.

The points 110 may be transparent to the user equipment (UE) 104. To a user equipment (UE) 104, antenna ports are distinguishable. An antenna port may belong to an antenna or set of antennas in one point 110 or a set of antennas in different points 110. However, points are distinguishable from the perspective of an eNode B 102. Therefore, in a transmission from a point 110 to the user equipment (UE) 104, from the perspective of the eNode B 102, all of the antenna ports participating in the transmission belong to the same point 110.

As used herein, a cooperating set refers to a set of geographically separated points 110 directly and/or indirectly participating in data transmission to a user equipment (UE) 104 in a time-frequency resource and/or data reception from a user equipment (UE) 104 in a time-frequency resource. The set of transmission and/or reception points 110 is a subset of the cooperating set. The cooperating set may or may not be transparent to the user equipment (UE) 104.

The user equipment (UE) 104 may include an uplink power allocation module 118. In LTE Release 8-10, the uplink power is calculated based on Equation (1):

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}. \quad (1)$$

In Equation (1), $PL_c$ is the path-loss parameter 122 between an antenna port, from which the reference signal is transmitted, and the user equipment (UE) 104. The path-loss parameter $PL_c$ 122 may be calculated at the user equipment (UE) 104. In communication modes such as coordinated multipoint (CoMP) transmission and coordinated multipoint (CoMP) reception, multiple points 110 may communicate with the user equipment (UE) 104 at the same time. These points 110 may not be collocated with the same base station in the same physical location. For example, each of the points 110b-c may be controlled by different base stations than the serving eNode B.

To calculate the path-loss parameter $PL_c$ 122, the user equipment (UE) 104 may need the transmit power of the reference signal transmitted by each point 110 or antenna port. However, using Release 10 or earlier, the user equipment (UE) 110 may receive the reference signal transmit power 146b for only one cell-specific reference signal (CRS). In Release 8, the user equipment (UE) 104 may have knowledge of the cell-specific reference signal (CRS) configuration, the transmit power 146b of the cell-specific reference signal (CRS) and the configurations of two channel state information reference signal (CSI-RS) configurations (but not their transmit power).

In coordinated multipoint (CoMP) reception, the user equipment (UE) 104 may need to measure multiple path loss parameters 122 (corresponding to the downlink channels between multiple points 110 or antenna ports and the user equipment (UE) 104). Therefore, the multiple points 110 or antenna ports may use additional reference signals.

If a different reference signal than the cell-specific reference signal (CRS) is transmitted by a point 110 or antenna port, the user equipment (UE) 104 may not have the reference signal transmit power 146b for the transmitted reference signal and consequently may not be able to calculate the path-loss parameter $PL_c$ 122 for the uplink 108 communication link between the user equipment (UE) 104 and the point 110 or antenna port that transmitted the reference signal. Having the ability to calculate the path-loss parameter $PL_c$ 122 for multiple reception points 110 or antenna ports enables the user equipment (UE) 104 to adjust the uplink transmission power, thereby reducing the interference in the wireless communication system 100 and increasing the flexibility of the wireless communication system 100 to utilize resources. In other words, the user equipment (UE) 104 may receive power allocation parameters (i.e., the received reference signal transmit powers 146b) and use these received power allocation parameters for uplink coordinated multipoint (CoMP) reception.

The uplink power allocation module 118 may measure the signal strength of received reference signals. Each measurement may be a reference signal received power (RSRP) 120. The uplink power allocation module 118 may also include the calculated path loss parameters 122.

The serving eNode B 102a may include a reference signal reporting module 116. In Release 8, Release 9 and Release 10, the serving eNode B 102a may send only the cell-specific reference signal (CRS) transmit power to the user equipment (UE) 104 via radio resource control (RRC) signaling. In LTE Release 8, and Release 10, this transmission of the CRS was transmitted only on antenna ports 0 to 3 while the remaining antenna ports, for example, antenna ports 4-22, were used to transmit other reference signals including the MBSFN reference signal US-Specific reference signals, Positioning reference signals, and CSI reference signals. However, no provisions were made for sending the reference signal transmit powers 114 of other reference signals sent by the points 110 or antenna ports to the user equipment (UE) 104. To counter this, the reference signal reporting module 116 may include a reference signal transmit power 146a for each of the other points 110 or antenna ports that transmits a reference signal to the user equipment (UE) 104. The serving eNode B 102a may receive the reference signal transmit powers 114 from each point 110 or antenna port that transmits a reference signal to the user equipment (UE) 104. If a point 110c is not located on or connected to the serving eNode B 102a (and is thus controlled by a cooperating eNode B 102b), the serving eNode B 102a may receive the reference signal transmit power 114c of that point 110c or antenna port from the cooperating eNode B 102b via backhaul 144 signaling.

Figure 2:
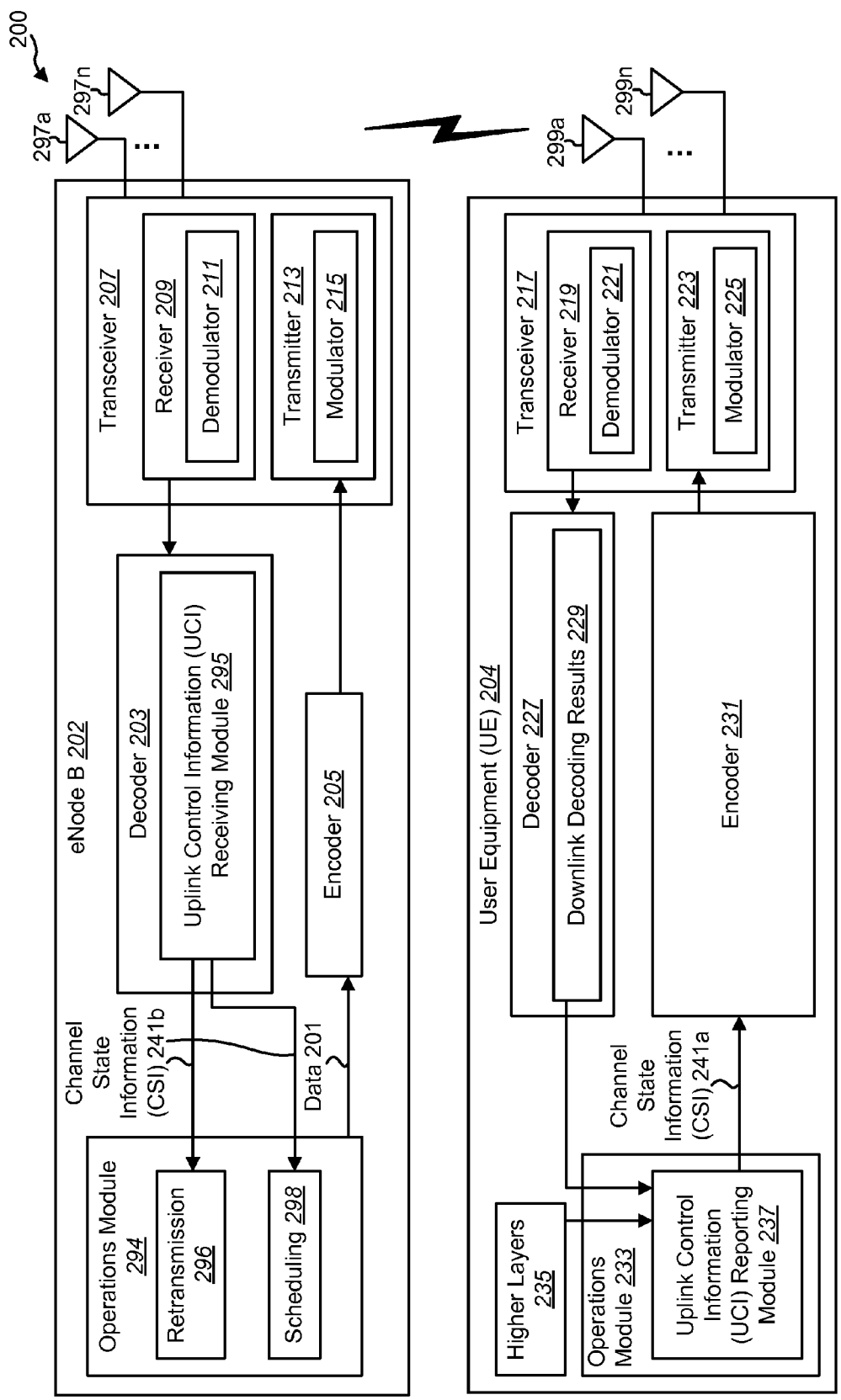
FIG. 2 is a block diagram illustrating a wireless communication system using uplink control information (UCI) multiplexing.

FIG. 2 is a block diagram illustrating a wireless communication system 200 using uplink control information (UCI) multiplexing. An eNode B 202 may be in wireless communication with one or more user equipments (UEs) 204. The eNode B 202 of FIG. 2 may be the serving eNode B 102a or the cooperating eNode B 102b of FIG. 1. The user equipment (UE) 204 of FIG. 2 may be one configuration of the user equipment (UE) 104 of FIG. 1.

The user equipment (UE) 204 communicates with the eNode B 202 using one or more antennas 299a-n. The user equipment (UE) 204 may include a transceiver 217, a decoder 227, an encoder 231 and an operations module 233. The transceiver 217 may include a receiver 219 and a transmitter 223. The receiver 219 may receive signals from the eNode B 202 using one or more antennas 299a-n. For example, the receiver 219 may receive and demodulate received signals using a demodulator 221. The transmitter 223 may transmit signals to the eNode B 202 using one or more antennas 299a-n. For example, the transmitter 223 may modulate signals using a modulator 225 and transmit the modulated signals.

The receiver 219 may provide a demodulated signal to the decoder 227. The user equipment (UE) 204 may use the decoder 227 to decode signals and make downlink decoding results 229. The downlink decoding results 229 may indicate whether data was received correctly. For example, the downlink decoding results 229 may indicate whether a packet was correctly or erroneously received (i.e., positive acknowledgement, negative acknowledgement or discontinuous transmission (no signal)).

The operations module 233 may be a software and/or hardware module used to control user equipment (UE) 204 communications. For example, the operations module 233 may determine when the user equipment (UE) 204 requires resources to communicate with an eNode B 202. The operations module 233 may receive instructions from higher layers 235.

The user equipment (UE) 204 may transmit uplink control information (UCI) to an eNode B 202 on the uplink. The uplink control information (UCI) may include channel state information (CSI) 241a in a channel state information (CSI) report, as discussed above in relation to FIG. 1. The uplink control information (UCI) may be transmitted on either the physical uplink control channel (PUCCH) or the physical uplink shared channel (PUSCH). The configuration of the transmission of the uplink control information (UCI) on the physical uplink control channel (PUCCH) and the physical uplink shared channel (PUSCH) may need to be transmitted on the downlink to the user equipment (UE) 204. The configuration/scheduling of the uplink control information (UCI) transmission in the uplink may be performed either dynamically on the physical downlink control channel (PDCCH) or semi-statically via radio resource control (RRC) signaling, which is transmitted to the user equipment (UE) 204 via the physical downlink shared channel (PDSCH). The uplink control information (UCI) may be reported from a user equipment (UE) 204 to an eNode B 202 either periodically or aperiodically.

The channel state information (CSI) 241a may be generated by the uplink control information (UCI) reporting module 237 and transferred to an encoder 231. The encoder 231 may generate uplink control information (UCI) using backwards compatible physical uplink control channel (PUCCH) formats and physical uplink shared channel (PUSCH) formats. Backwards compatible physical uplink control channel (PUCCH) formats are those formats that may be used by Release-10 user equipments (UEs) 204 as well as Release-8/9 user equipments (UEs) 204.

The time and frequency resources may be quantized to create a grid known as the Time-Frequency grid. In the time domain, 10 milliseconds (ms) is referred to as one radio frame. One radio frame may include 10 subframes, each with a duration of one ms, which is the duration of transmission in the uplink and/or downlink. Every subframe may be divided into two slots, each with a duration of 0.5 ms. Each slot may be divided into seven symbols. The frequency domain may be divided into bands with a 15 kilohertz (kHz) width, referred to as a subcarrier. One resource element has a duration of one symbol in the time domain and the bandwidth of one subcarrier in the frequency domain.

The minimum amount of resource that can be allocated for the transmission of information in the uplink or downlink in any given subframe is two resource blocks (RBs), one RB at each slot. One RB has a duration of 0.5 ms (seven symbols or one slot) in the time domain and a bandwidth of 12 subcarriers (180 kHz) in the frequency domain. At any given subframe, a maximum of two RBs (one RB at each slot) can be used by a given user equipment (UE) 204 for the transmission of uplink control information (UCI) in the physical uplink control channel (PUCCH).

An eNode B 202 may include a transceiver 207 that includes a receiver 209 and a transmitter 213. An eNode B 202 may additionally include a decoder 203, an encoder 205 and an operations module 294. An eNode B 202 may receive uplink control information (UCI) using multiple antennas 297a-n and a receiver 209. The receiver 209 may use the demodulator 211 to demodulate the uplink control information (UCI).

The decoder 203 may include an uplink control information (UCI) receiving module 295. An eNode B 202 may use the uplink control information (UCI) receiving module 295 to decode and interpret the uplink control information (UCI) received by the eNode B 202. The eNode B 202 may use the decoded uplink control information (UCI) to perform certain operations, such as retransmit one or more packets based on scheduled communication resources for the user equipment (UE) 204. The uplink control information (UCI) may include channel state information (CSI) 241b.

The operations module 294 may include a retransmission module 296 and a scheduling module 298. The retransmission module 296 may determine which packets to retransmit (if any) based on the uplink control information (UCI). The scheduling module 298 may be used by the eNode B 202 to schedule communication resources (e.g., bandwidth, time slots, frequency channels, spatial channels, etc.). The scheduling module 298 may use the uplink control information (UCI) to determine whether (and when) to schedule communication resources for the user equipment (UE) 204.

The operations module 294 may provide data 201 to the encoder 205. For example, the data 201 may include packets for retransmission and/or a scheduling grant for the user equipment (UE) 204. The encoder 205 may encode the data 201, which may then be provided to the transmitter 213. The transmitter 213 may modulate the encoded data using the modulator 215. The transmitter 213 may transmit the modulated data to the user equipment (UE) 204 using the antennas 297a-d.

Figure 3:
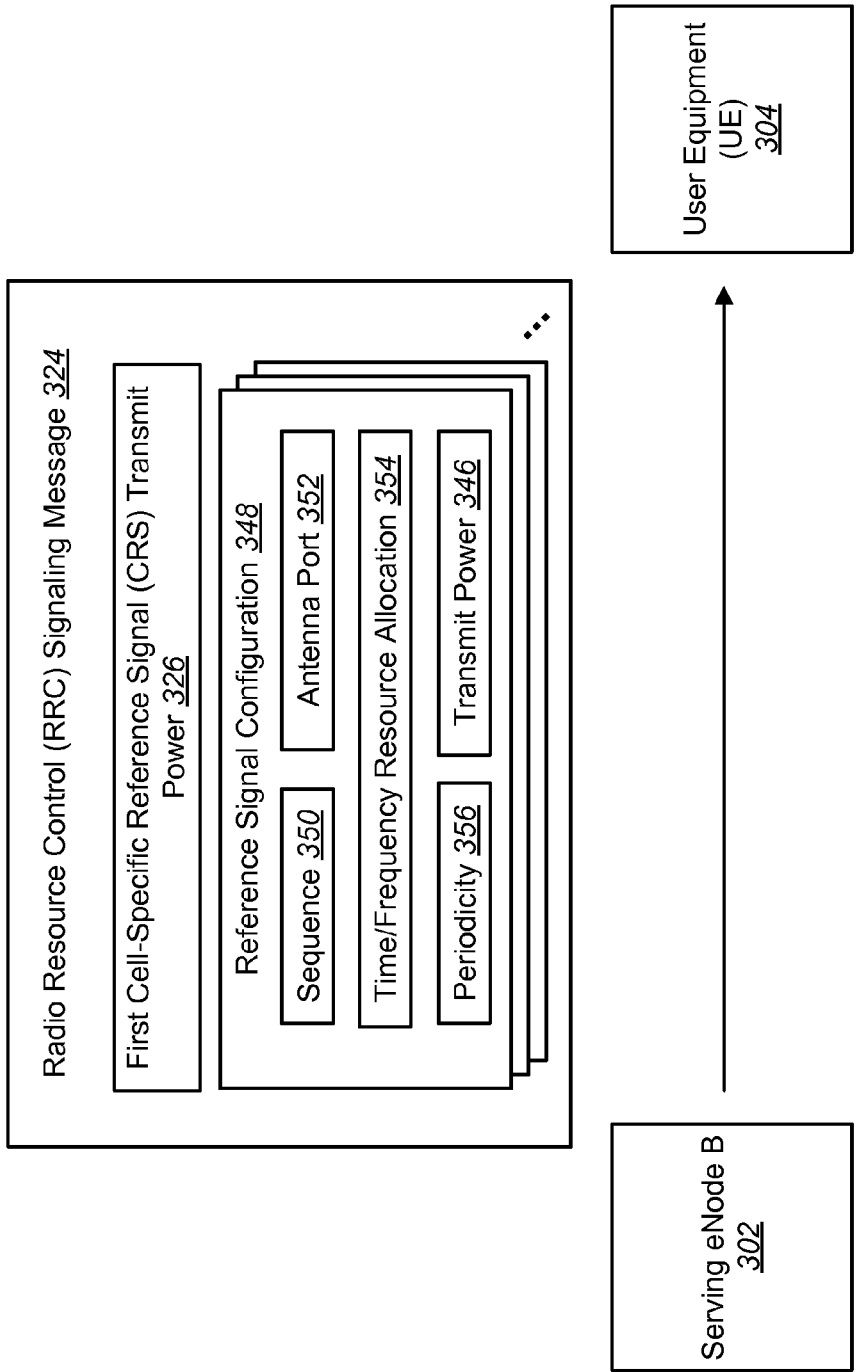
FIG. 3 is a block diagram illustrating radio resource control (RRC) signaling between a serving eNode B and a user equipment (UE)

FIG. 3 is a block diagram illustrating radio resource control (RRC) signaling between a serving eNode B 302 and a user equipment (UE) 304. The serving eNode B 302 of FIG. 3 may be one configuration of the serving eNode B 102a of FIG. 1. The user equipment (UE) 304 of FIG. 3 may be one configuration of the user equipment (UE) 104 of FIG. 1. The serving eNode B 302 may send a radio resource control (RRC) signaling message 324 to the user equipment (UE) 304. The points 110 used by the serving eNode B 302 to send the radio resource control (RRC) signaling message 324 to the user equipment (UE) 304 is outside of the scope of the present systems and methods.

As discussed above, prior to uplink transmissions from a user equipment (UE) 304 to reception points 110 or antenna ports, the reception points 110 may transmit a known reference signal to the user equipment (UE) 304. The user equipment (UE) 304 may use this reference signal for uplink power allocation. Multiple different reference signals may be sent by different reception points 110 to the user equipment (UE) 304 and the user equipment (UE) 304 may calculate the path-loss parameter $PL_c$ 122 for each reception point 110.

Different reference signals may be used by the user equipment (UE) 304 for measuring the reference signal received power (RSRP) 120 and calculating the path loss parameters $PL_c$ 122. For example, a cell-specific reference signal (CRS) or a channel state information reference signal (CSI-RS) may be used. In Release 10 configurations (e.g., time-frequency resource allocation, periodicity, antenna port and sequence), up to two channel state information reference signal (CSI-RS) may be sent to the user equipment (UE) 304. If the channel state information reference signal (CSI-RS) is used by the user equipment (UE) 304 for measuring the reference signal received power (RSRP) 120, then by having the transmit power of the channel state information reference signal (CSI-RS), the user equipment (UE) 304 can calculate the path loss parameter $PL_c$ 122 corresponding to the point 110 from which the channel state information reference signal (CSI-RS) was transmitted.

In Release 10, two channel state information reference signal (CSI-RS) configurations are supported. However, if there are more than two reception points 110 or antenna ports, additional reference signals may be needed in order for the user equipment (UE) 304 to measure the reference signal received power (RSRP) 120 and calculate the path-loss parameter $PL_c$ 122 for each reception point 110 or antenna port.

In Release 8, a user equipment (UE) 304 may have information about the cell-specific reference signal (CRS) sequence of up to six of its neighboring cells (or points 110) with different cell IDs than the serving cell. The reference signal sequence of each neighboring cell or point 110 in Release 8 may be derived from the cell ID of that cell or point.

The radio resource control (RRC) signaling message 324 may include a first cell-specific reference signal (CRS) transmit power 326 for the cell-specific reference signal (CRS) (as used in Release 8 and later). The radio resource control (RRC) signaling message 324 may also include one or more reference signal configurations 348. Each reference signal configuration 348 may correspond to a different reference signal transmitted by a point 110 or antenna port to the user equipment (UE) 304. A reference signal configuration 348 may include a sequence 350 used, an antenna port 352 used, the time/frequency resource allocation 354, the periodicity 356 and the transmit power 346.

The reference signals that the reference signal configurations 348 correspond to may be channel state information reference signals (CSI-RS) or additional cell-specific reference signals (CRS). If a reference signal is channel state information reference signal (CSI-RS), the reference signal transmit power 346 of the channel state information reference signal (CSI-RS) may be included in a CSI-RS-Config information element of the radio resource control (RRC) signaling message 324. Sample code for a CSI-RS-Config information element is given below:

```
-- ASN1START
CSI-RS-Config-r10 ::=         SEQUENCE {
    csi-RS-r10                CHOICE {
        release                   NULL,
        setup                     SEQUENCE {
            antennaPortsCount-r10     ENUMERATED {an1, an2, an4, an8},
```

-continued

```
            resourceConfig-r10        INTEGER (0..31),
            subframeConfig-r10        INTEGER (0..154),
            p-C-r10                   INTEGER (-8..15)
        }
    }                                                 OPTIONAL, -- Need ON
    zeroTxPowerCSI-RS-r10       CHOICE {
        release                     NULL,
        setup                       SEQUENCE {
            zeroTxPowerResourceConfigList-r10    BIT STRING (SIZE (16)),
            zeroTxPowerSubframeConfig-r10        INTEGER (0..154)
        }
    }                                                 OPTIONAL -- Need ON
}
-- ASN1STOP
```

In the sample code for a CSI-RS-Config information element, antennaPortsCount is a parameter that represents the number of antenna ports used for transmission of channel state information (CSI) reference signals, where an1 corresponds to one antenna port, an2 corresponds to two antenna ports, etc. In the sample code for a CSI-RS-Config information element, p-C refers to the parameter $P_c$ and resourceConfig refers to the channel state information (CSI) reference signal configuration. The field subframeConfig refers to the parameter $I_{CSI-RS}$.

In the sample code, there is information about two channel state information reference signals (CSI-RS). The field CSI-RS-Config-r10 includes information about the channel state information reference signal (CSI-RS) used by the serving eNode B 102a and the user equipment (UE) 304 to measure the downlink channel and generate information such as the channel quality indicator (CQI), the rank indicator (RI) and the precoding matrix indicator (PMI) to be fed back. The field zeroTxPowerCSI-RS-r10 includes information about the channel state information reference signal (CSI-RS) used by a neighboring cell. An eNode B 102 may allocate zero power (muting) on the resource elements allocated to the transmission of this channel state information reference signal (CSI-RS) in order to reduce interference.

The field zeroTxPowerResourceConfigList refers to the parameter ZeroPowerCSI-RS. The fields subframeConfig-r10 and zeroTxPowerSubframeConfig-r10 both indicate the subframe configuration of a channel state information reference signal (CSI-RS), one that is used by the cell and the other for a muted one (i.e., zero power). Both the field subframeConfig-r10 and the field zeroTxPowerSubframeConfig-r10 may be obtained from ICSI-RS. The ICSI-RS may have a different value for the two different channel state information reference signals (CSI-RS).

In one configuration, up to two channel state information reference signal (CSI-RS) configurations may be sent to a user equipment (UE) 304 in a radio resource control (RRC) signaling message 324. In another configuration, more than two channel state information reference signal (CSI-RS) configurations may be sent to a user equipment (UE) 304 in a radio resource control (RRC) signaling message 324.

A cell-specific reference signal (CRS) may be transmitted based on the downlink power allocation described in Section 5.2 of 36.213 PHY layer procedures. The parameters for downlink power allocation may be transmitted to the user equipment (UE) 304 through radio resource control (RRC) signaling in a PDSCH-Config information element. If a reference signal is a cell-specific reference signal (CRS), the reference signal transmit power 346 may be included in the PDSCH-Config information element. Sample code for a PDSCH-Config information element is given below:

```
-- ASN1START
PDSCH-ConfigCommon ::=      SEQUENCE {
    referenceSignalPower            INTEGER (-60..50),
    p-b                             INTEGER (0..3)
}
PDSCH-ConfigDedicated::=     SEQUENCE {
    p-a                             ENUMERATED {
                                        dB-6, dB-4dot77, dB-3,
                                        dB-1dot77, dB0, dB1,
                                        dB2, dB3}
}
-- ASN1STOP
```

In the PDSCH-Config information element, p-a refers to the parameter $P_A$. A value of dB-6 corresponds to −6 dB; a value of dB-4 dot77 corresponds to −4.77 dB, etc. In the PDSCH-Config information element, p-b refers to the parameter $P_B$ and referenceSignalPower provides the downlink reference signal energy per resource element (EPRE) in dBm (i.e., the reference signal transmit power 346). If a reference signal is a cell-specific reference signal (CRS), the cell-specific reference signal (CRS) may have a different sequence 350 than that of the serving eNode B cell-specific reference signal (CRS).

In Release 8 of 3GPP, a user equipment (UE) 304 may have information about the cell-specific reference signal (CRS) sequence of up to six of its neighboring cells with different cell IDs than the serving cell. The reference signal sequence of each neighboring cell or point 110 may be derived from the cell ID of that cell or point 110. Using the cell-specific reference signal (CRS), the user equipment (UE) 304 may obtain the reference signal received power (RSRP) 120 of the neighboring cells or points.

The implementation of point(s) 110 may be transparent to the user equipment (UE) 304. Thus, in a procedure for measuring the reference signal received power (RSRP) 120, the user equipment (UE) 304 may only need information about the transmit antenna ports, the set of the transmit antenna ports or the set of reference signals to be used. The user equipment (UE) 304 may not need to know whether the antenna ports are collocated or geographically separated. In this case, there is no need for the user equipment (UE) 304 to associate antenna ports used for transmission of each reference signal to the specific points 110. It may suffice that the user equipment (UE) 304 has information about the configuration of transmitted reference signals (such as the periodicity 356, the time-frequency resource allocation 354 for transmission of the reference signal, the reference signal sequence 350 and/or the reference signal transmit power 346).

Figure 4:
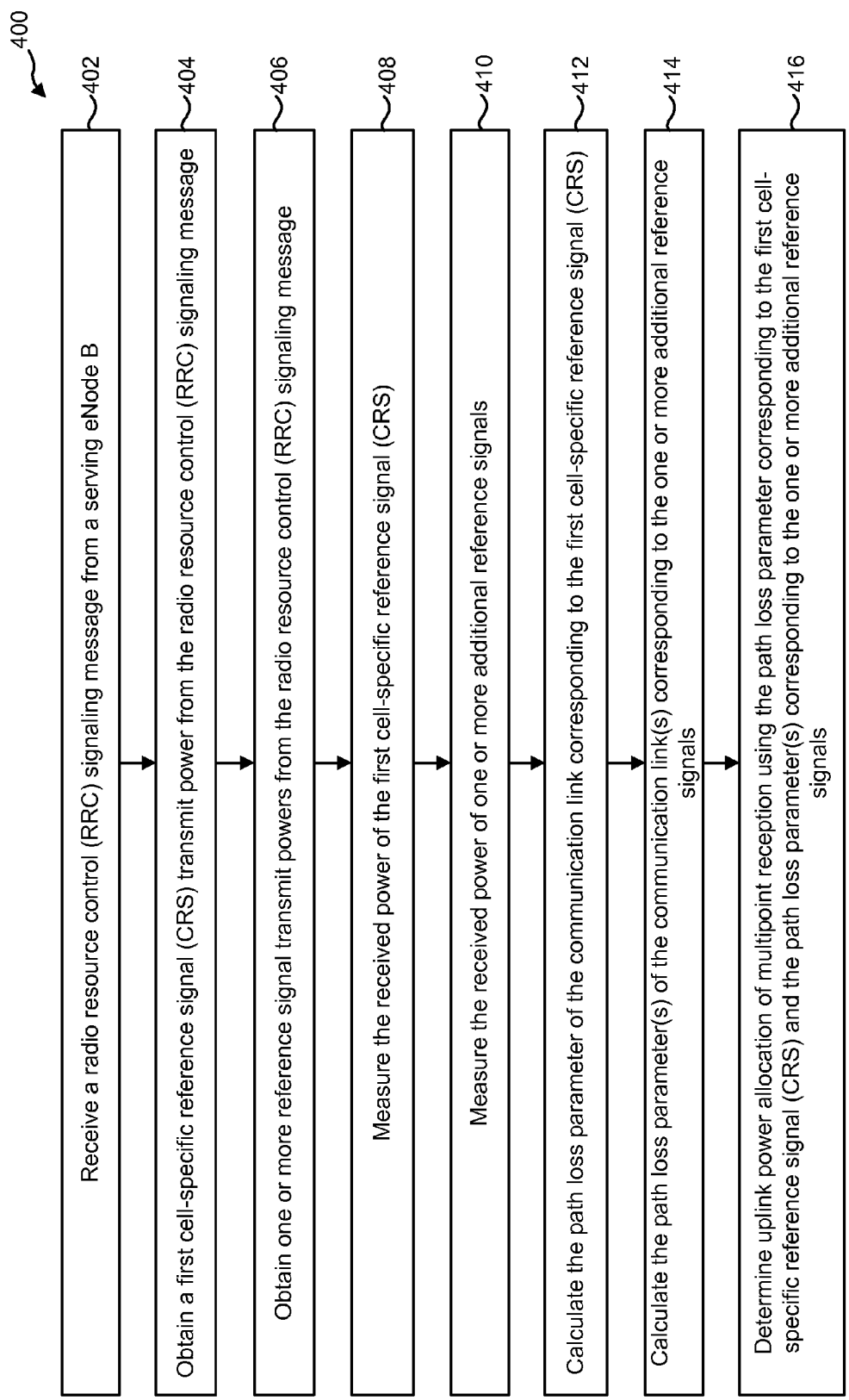
FIG. 4 is a flow diagram of a method for calculating the path loss parameter of a communication link between a user equipment (UE) and multiple reception points.

FIG. 4 is a flow diagram of a method 400 for calculating the path loss parameter 122 of a communication link between a user equipment (UE) 104 and multiple reception points 110. The method 400 may be performed by a user equipment (UE)

104. The user equipment (UE) 104 may receive 402 a radio resource control (RRC) signaling message 324 from a serving eNode B 102*a*. The user equipment (UE) 104 may obtain 404 a first cell-specific reference signal (CRS) transmit power 326 from the radio resource control (RRC) signaling message 324. As discussed above, the first cell-specific reference signal (CRS) transmit power 326 may be the transmit power of the cell-specific reference signal (CRS) transmitted to the user equipment (UE) 104. The user equipment (UE) 104 may also obtain 406 one or more reference signal transmit powers 346 from the radio resource control (RRC) signaling message 324. The reference signal transmit powers 346 may correspond to one or more reference signals transmitted by reception points 110 or antenna ports The user equipment (UE) 104 may measure 408 the received power of a serving eNode B cell-specific reference signal (CRS) transmitted by the serving eNode B 102 (i.e., the reference signal received power (RSRP) 120). The user equipment (UE) 104 may also measure 410 the received power of one or more additional reference signals (i.e., the reference signal received power (RSRP) 120). The one or more additional reference signals may be transmitted by one or more points 110 or antenna ports. The user equipment (UE) 104 may calculate 412 the path loss parameter 122 corresponding to the first cell-specific reference signal (CRS). The user equipment (UE) 104 may also calculate 414 the path loss parameter(s) 122 corresponding to the one or more additional reference signals. The user equipment (UE) 104 may determine 416 the uplink power allocation of multipoint reception using the path loss parameter 122 corresponding to the first cell-specific reference signal (CRS) and the path loss parameter 122 corresponding to the one or more additional reference signals.

Figure 5:
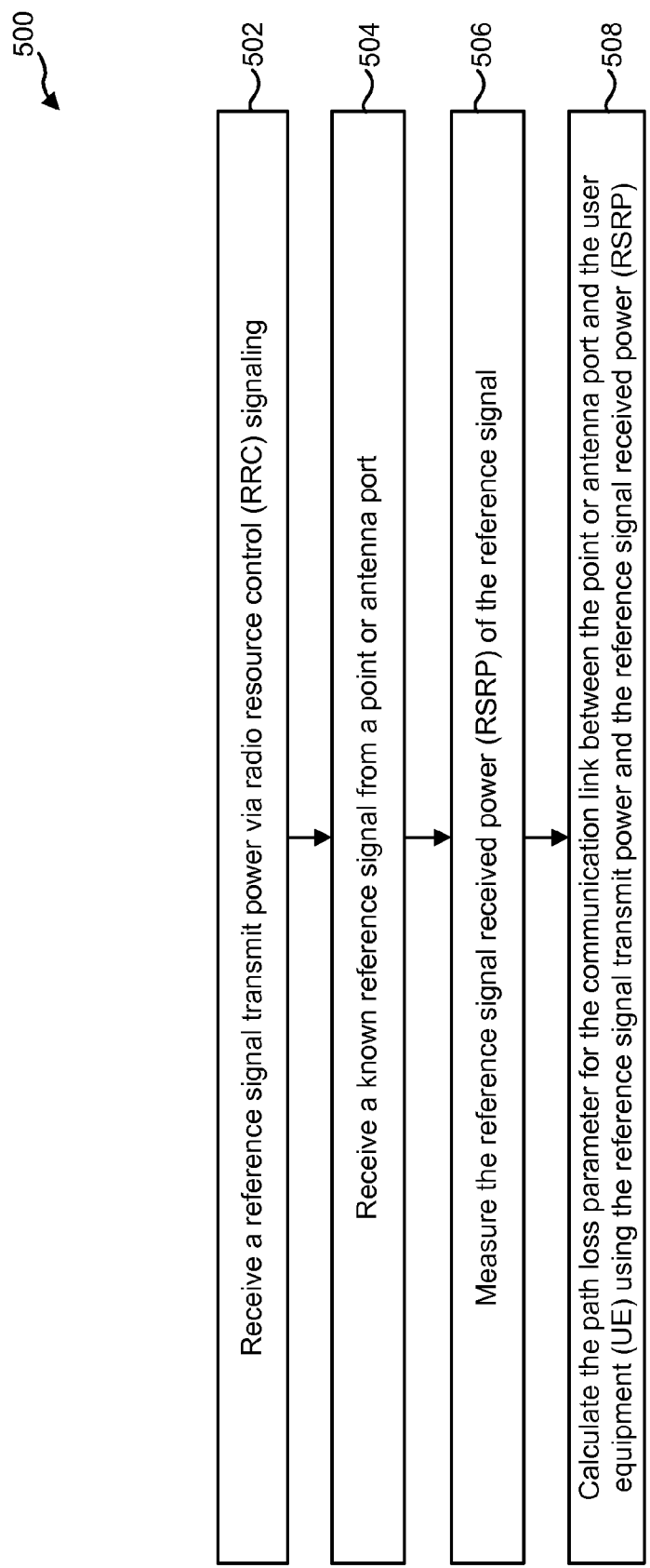
FIG. 5 is a flow diagram of a method for calculating a path loss parameter corresponding to a reference signal.

FIG. 5 is a flow diagram of a method 500 for calculating a path loss parameter 122 corresponding to a reference signal. The method 500 may be performed by the user equipment (UE) 104. The user equipment (UE) 104 may receive 502 a reference signal transmit power 346 corresponding to a point 110 or antenna port that has transmitted the reference signal via radio resource control (RRC) signaling. The reference signal transmit power 346 may be received from a serving eNode B 102*a*. The user equipment (UE) 104 may receive 504 a known reference signal from the point 110 or antenna port. The known reference signal may be a cell-specific reference signal (CRS) or a channel state information reference signal (CSI-RS).

The user equipment (UE) 104 may measure 506 the reference signal received power (RSRP) 120 of the reference signal. In one configuration, the user equipment (UE) 104 may measure 506 the reference signal received power (RSRP) 120 at the time-frequency grid and on the pre-specified antenna port (or spatial dimension) in which the cell-specific reference signal (CRS) is transmitted. The user equipment (UE) 104 may then calculate 508 the path loss parameter for the communication link between the point 110 or antenna port and the user equipment (UE) 104 using the reference signal transmit power 346 and the reference signal received power (RSRP) 120. If both the reference signal received power (RSRP) 120 and the reference signal transmit power 346 are in watts, the path loss parameter $PL_c$ 122 may be found as the reference signal transmit power 346 divided by the reference signal received power (RSRP) 120. If both the reference signal received power (RSRP) 120 and the reference signal transmit power 346 are in dB, then the $PL_c = 10^{(RST \times RSRP)/10}$, where RST is the reference signal transmit power 346.

Figure 6:
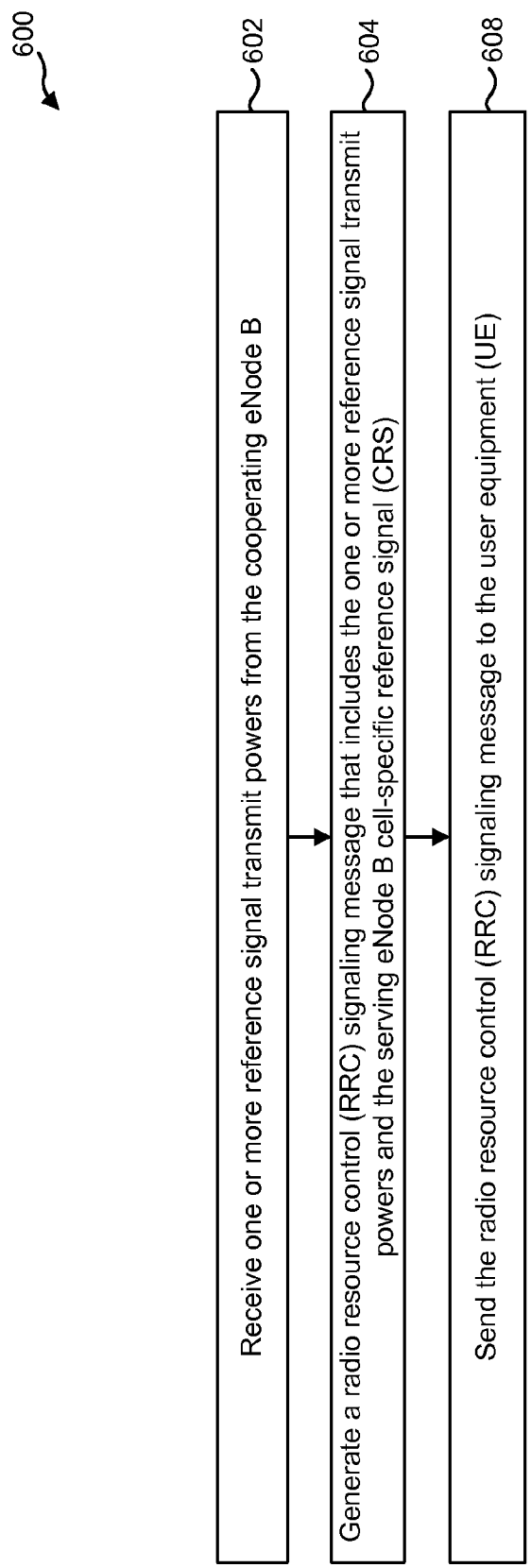
FIG. 6 is a flow diagram of a method for providing a user equipment (UE) with reference signal transmit powers corresponding to one or more reference signals transmitted by reception points or antenna ports.

FIG. 6 is a flow diagram of a method 600 for providing a user equipment (UE) 104 with reference signal transmit powers 114 corresponding to one or more reference signals transmitted by reception points 110 or antenna ports. The method 600 may be performed by a serving eNode B 202. In one configuration, all the points 110 transmitting a reference signal to the user equipment (UE) 104 may be controlled by the serving eNode B 102*a*; therefore, all the information is available at the serving eNode B 102*a*. In another configuration, some of the points 110 transmitting a reference signal to the user equipment (UE) 104 may be controlled by a cooperating eNode B 102*b* (or cooperating eNode Bs 102*b*). When some of the points 110 transmitting a reference signal to the user equipment (UE) 104 are controlled by a cooperating eNode B 102*b*, the serving eNode B 102*a* may receive 602 one or more reference signal transmit powers 114 from the cooperating eNode B 102*b*. In one configuration, the serving eNode B 102*a* may receive 602 the one or more reference signal transmit powers 114 via a backhaul interface 144 between the serving eNode B 102*a* and the cooperating eNode B 102*b*.

The serving eNode B 102*a* may generate 604 a radio resource control (RRC) signaling message 324 that includes the one or more reference signal transmit powers 346 (and other information associated with each reference signal) and the first cell-specific reference signal (CRS). The serving eNode B 102*a* may then send 606 the radio resource control (RRC) signaling message 324 to the user equipment (UE) 104.

Figure 7:
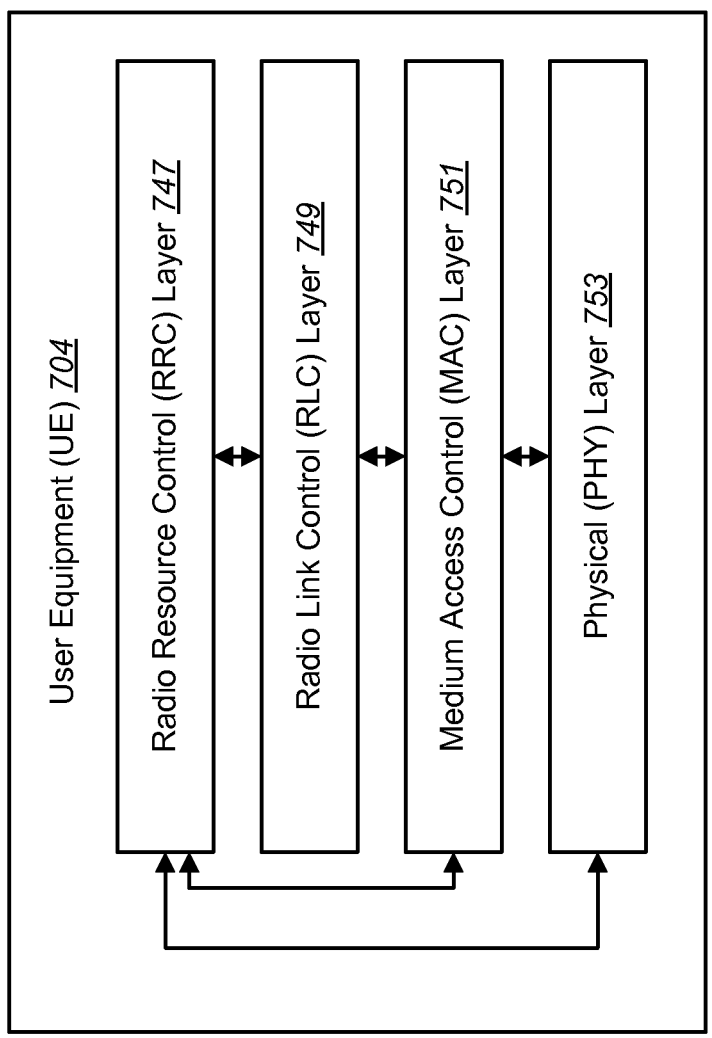
FIG. 7 is a block diagram illustrating the layers used by a user equipment (UE)

FIG. 7 is a block diagram illustrating the layers used by a user equipment (UE) 704. The user equipment (UE) 704 of FIG. 7 may be one configuration of the user equipment (UE) 104 of FIG. 1. The user equipment (UE) 704 may include a radio resource control (RRC) layer 747, a radio link control (RLC) layer 749, a medium access control (MAC) layer 751 and a physical (PHY) layer 753. These layers may be referred to as higher layers 235. The user equipment (UE) 704 may include additional layers not shown in FIG. 7.

Figure 8:
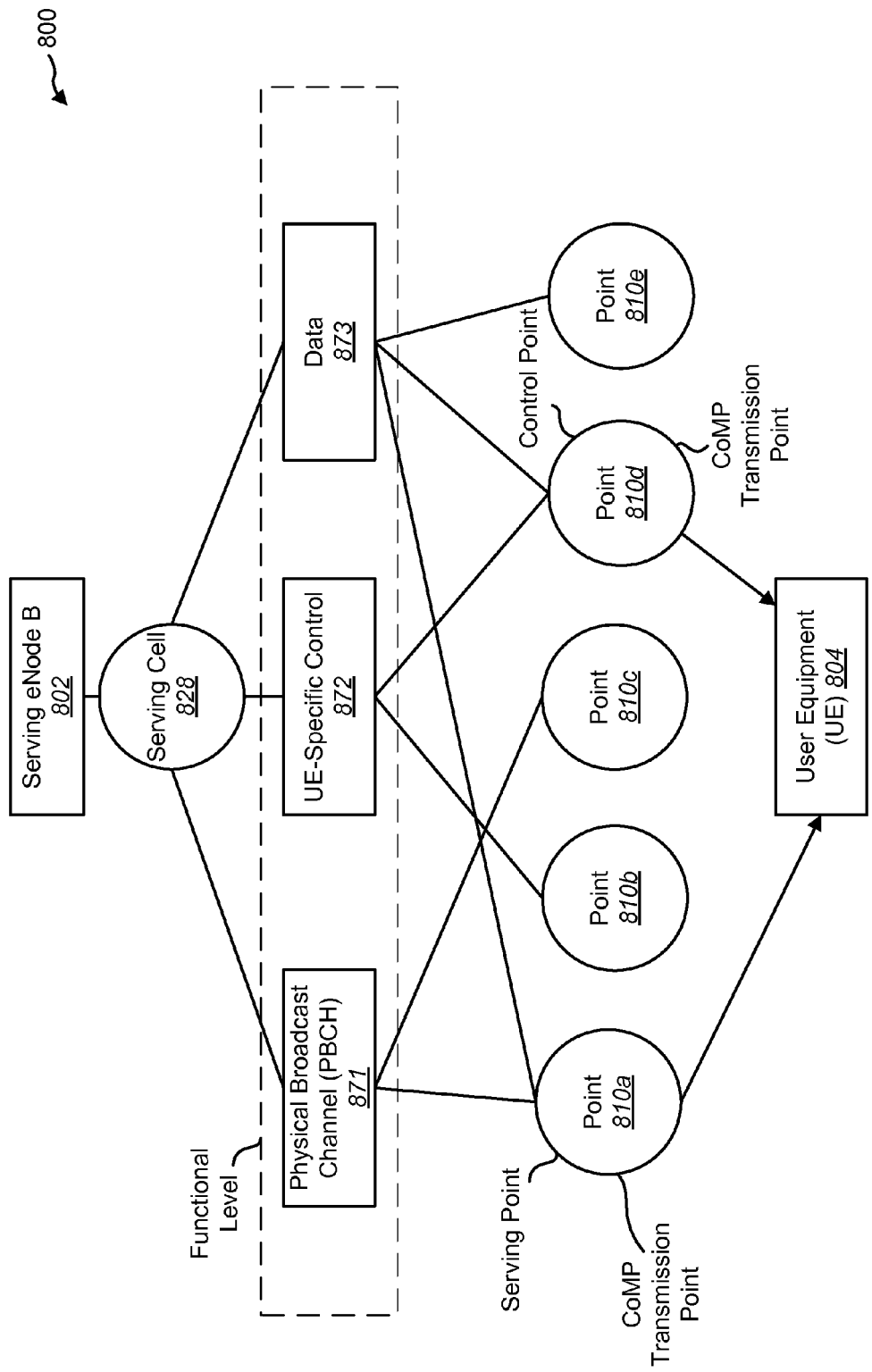
FIG. 8 is a block diagram illustrating a wireless communication system with a single eNode B and coordinated multipoint (CoMP) points that have the same cell ID.

FIG. 8 is a block diagram illustrating a wireless communication system 800 with a single eNode B 802 and coordinated multipoint (CoMP) points 810*a-e* that have the same cell ID. The wireless communication system 800 may include only one eNode B 802 that is communicating with a user equipment (UE) 804. The eNode B 802 may thus be the serving eNode B 802 for the user equipment (UE) 804. The eNode B 802 is a physical structure that may include multiple antennas. Some of the antennas may be collocated with the eNode B 802 while other antennas are geographically separated. Both the collocated antennas and the geographically separated antennas may be referred to as points 810. Much of the processing for the wireless communication system 800, such as baseband processing and scheduling, are performed at the eNode B 802.

The eNode B 802 may have one or more cells. In sectorization, each sector may be a cell. In carrier aggregation, each component carrier is a cell. Each point 810 may have limited functionality, mostly related to radio frequency (RF) transmission. In this configuration, because the points 810 have the same cell ID, each point is associated with the serving cell 828

A primary cell is the cell, operating on the primary frequency, that the user equipment (UE) 804 performs the initial connection establishment procedure with or initiates the connection re-establishment procedure with. The primary cell may also be the cell indicated as the primary cell in a handover procedure. The secondary cell, operating on a secondary frequency, may be used to provide additional radio resources. The secondary cell may be configured once an RRC connection is established.

For a user equipment (UE) 804 in RRC_CONNECTED not configured with carrier aggregation, there may be only one serving cell 828 (and this serving cell 828 is the primary cell). For a user equipment (UE) 804 in RRC_CONNECTED that is configured with carrier aggregation, the serving cell 828 is used to refer to the set of one or more cells that includes the primary cell and all secondary cells.

Figure 9:
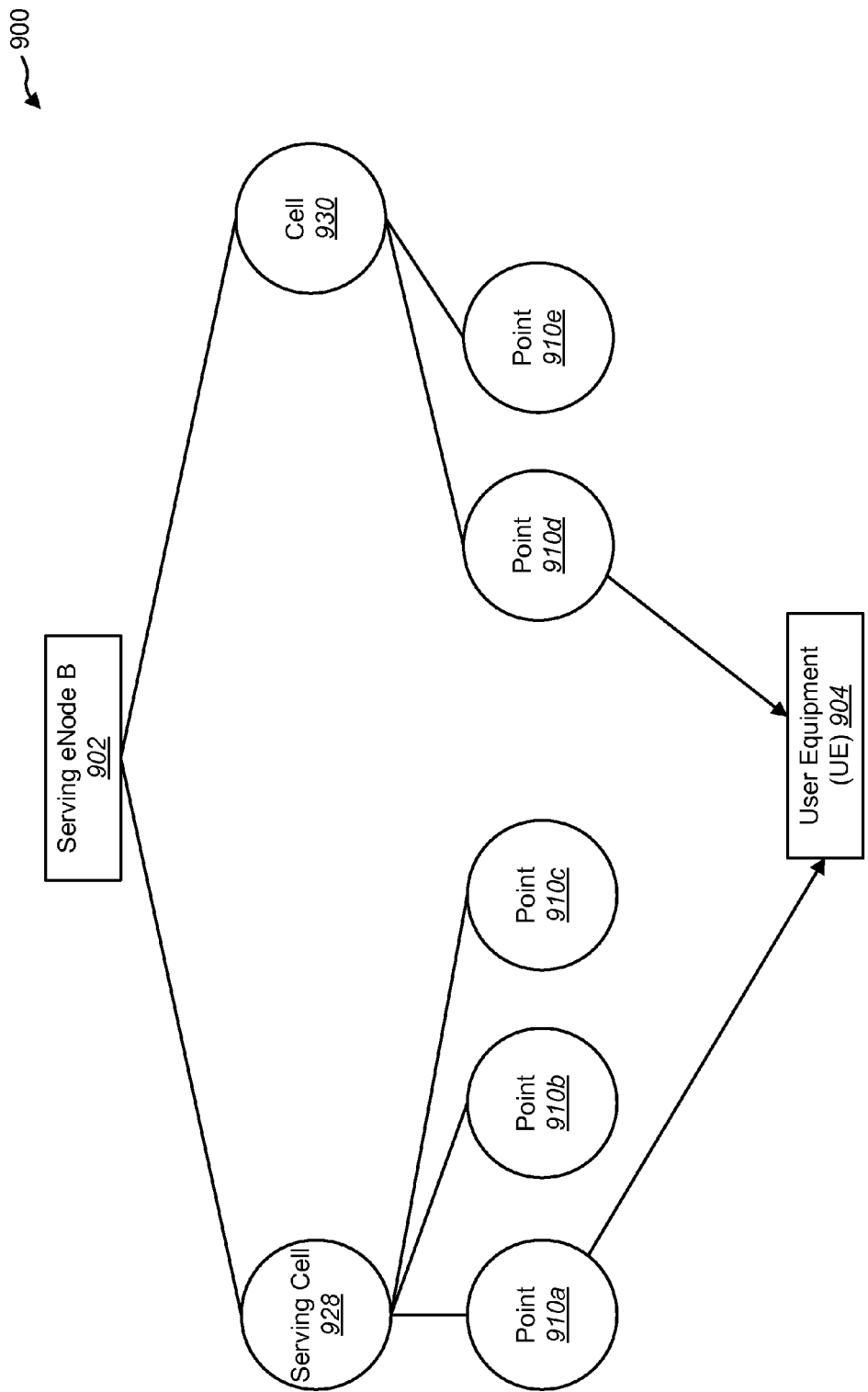
FIG. 9 is a block diagram illustrating a wireless communication system with a single eNode B and coordinated multipoint (CoMP) points that may have different cell IDs.
Figure 10:
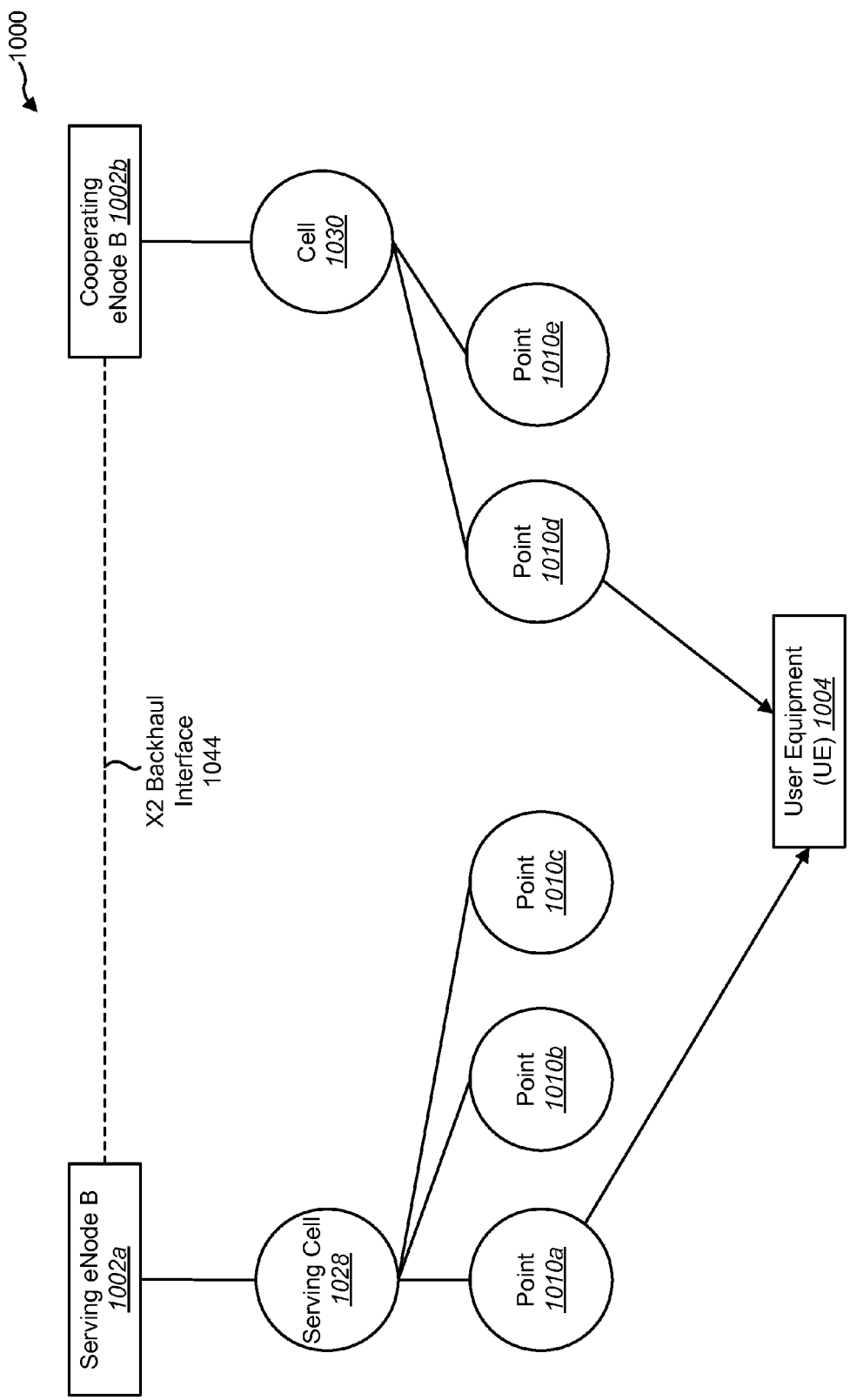
FIG. 10 is a block diagram wireless communication system with multiple eNode Bs and coordinated multipoint (CoMP) points that have different cell IDs.

When carrier aggregation is configured, the user equipment (UE) 804 may have only one RRC connection with the network. At RRC connection establishment/re-establishment/handover, one serving cell 828 may provide the NAS mobility information. This serving cell 828 may be referred to as the primary cell. Secondary cells may be configured to form a set of serving cells 828 with the primary cell. In coordinated multipoint (CoMP), if carrier aggregation is configured, there may be multiple serving cells 828 and the coordination among points 810 may happen in a carrier frequency in each serving cell. FIG. 8, FIG. 9 and FIG. 10 focus on one carrier frequency.

At the functional level, the serving cell 828 may include the physical broadcast channel (PBCH) 871, UE-specific control 872 and data 873. In this configuration, the point 810a may act as both a serving point (because the point 810a transmits the physical broadcast channel (PBCH) 871 and a CoMP transmission point (because the point 810a transmits data 873) to the user equipment (UE) 804. There may be additional serving points (not shown). The point 810d may act as both a control point (because the point 810d transmits UE-specific control 872) and a CoMP transmission point 834b (because the point 810d transmits data 873) to the user equipment (UE) 804. There may be additional control points (not shown).

In a non-coordinated multipoint (CoMP) transmission, there may be multiple serving points 810, from which the user equipment (UE) 804 receives the physical broadcast channel (PBCH) 871, but only one point 810 may participate in the transmission of the physical downlink shared channel (PDSCH) to the user equipment (UE) 804. The serving eNode B 802 may decide which point 810 is used for the transmission of the physical downlink shared channel (PDSCH) to the user equipment (UE) 804; this decision may or may not be transparent to the user equipment (UE) 804.

When transmission of the physical downlink control channel (PDCCH) and physical downlink shared channel (PDSCH) is considered, the serving point is referred to as a control point.

In a coordinated multipoint (CoMP) transmission, multiple points 810 coordinated with each other in transmissions to the user equipment (UE) 804. Those points 810 that are transmitting data 873 in the downlink 106 to a user equipment (UE) 804 may be referred to as coordinated multipoint (CoMP) transmission points. Those points 810 that are receiving in the uplink 108 from a user equipment (UE) 804 may be referred to as CoMP reception points (not shown). The points 810b, 810d and 810e may be used for transmissions to other user equipments (UEs) 104.

In FIG. 8, only the downlink coordinated multipoint (CoMP) transmission is illustrated. However, a similar model may be used to illustrate uplink coordinated multipoint (CoMP) reception. In this model, some of the points 810 may operate as reception points 810. A reception point 810 may receive uplink transmissions from the user equipment (UE) 804.

FIG. 9 is a block diagram illustrating a wireless communication system 900 with a single eNode B 902 and coordinated multipoint (CoMP) points 910a-e that may have different cell IDs. The single eNode B 902 may be the serving eNode B 902 for the user equipment (UE) 904. The serving eNode B 902 may have two cells: a serving cell 928 and a cell 930. The points 910a-c may be associated with the serving cell 928. The points 910d-e may be associated with the cell 930. The cell 930 may be referred to as a cooperating cell, a cooperative cell or a supportive cell. The cell 930 may be in the same carrier frequency as the serving cell 928 and may coordinate with the serving cell 928.

The point 910a may be both a serving point and a CoMP transmission point. The point 910d may be only a CoMP transmission point and cannot be a serving point or a control point (because the point 910d is associated with the cell 930 and not the serving cell 928). The other points 910b, 910c, 910e may be used for transmissions to other user equipments (UEs) 104.

FIG. 10 is a block diagram wireless communication system 1000 with multiple eNode Bs 1002a-b and coordinated multipoint (CoMP) points 1010a-e that have different cell IDs. The wireless communication system 1000 may include multiple eNode Bs 1002a-b that are communicating with a user equipment (UE) 1004. A first eNode B 1002a may be a serving eNode B 1002a while a second eNode B 1002b is a cooperating eNode B 1002b. The first eNode B 1004a and the second eNode B 1002b may use an X2 backhaul interface 1044 for exchanging necessary information with each other.

The serving eNode B 1002a may include a serving cell 1028. The serving eNode B 1002a may include additional cells that are not shown. Three points 1010a-c are associated with the serving cell 1028. The cooperating eNode B 1002b may include a cell 1030. The cell 1030 may be referred to as a cooperating cell, a cooperative sell or a supportive cell. The cell 1030 may use the same carrier frequency as the serving cell 1028 and may coordinate with the serving cell 1028. Two points 1010d-e are associated with the cell 1030. The points 1010a-c may have a different cell ID than the points 1010d-e.

The point 1010a may be both a serving point and a CoMP transmission point. The point 1010d is only a CoMP transmission point (and can not be a serving point or a control point). The points 1010b, 1010c and 1010e may be used for transmissions to other user equipments (UEs) 104.

Figure 11:
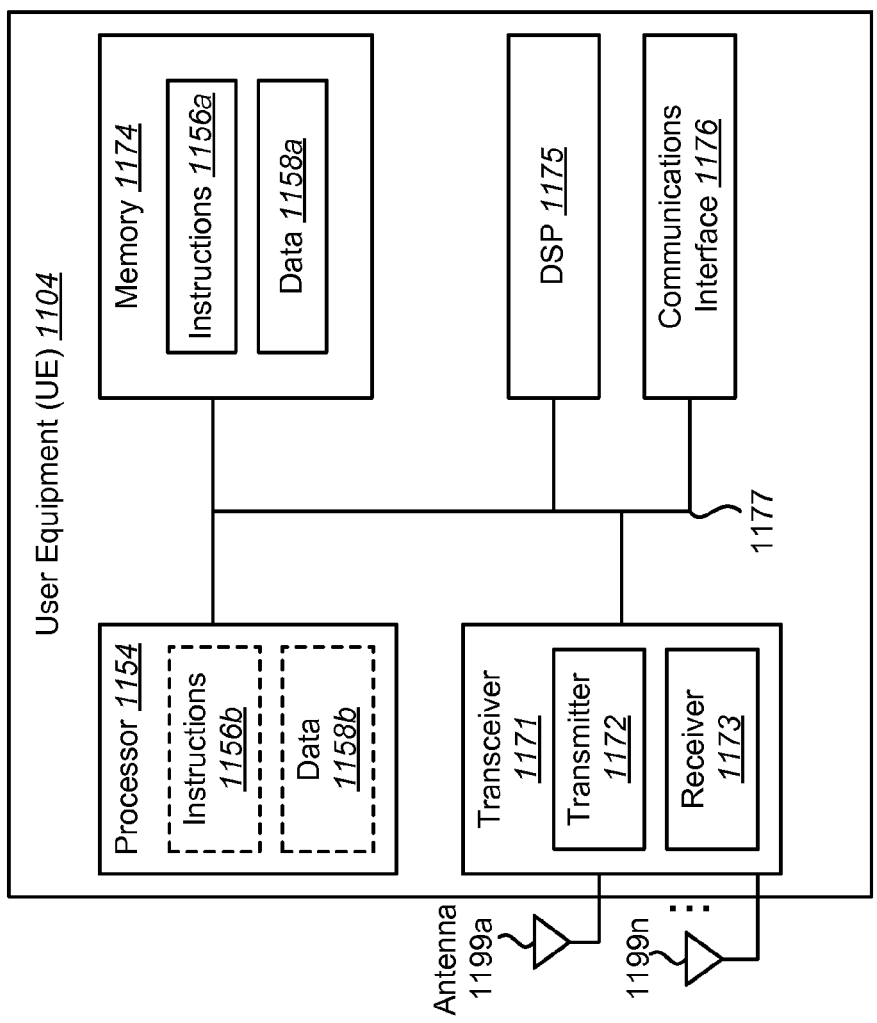
FIG. 11 illustrates various components that may be utilized in a user equipment (UE)

FIG. 11 illustrates various components that may be utilized in a user equipment (UE) 1104. The user equipment (UE) 1104 may be utilized as the user equipment (UE) 104 illustrated previously. The user equipment (UE) 1104 includes a processor 1154 that controls operation of the user equipment (UE) 1104. The processor 1154 may also be referred to as a CPU. Memory 1174, which may include both read-only memory (ROM), random access memory (RAM) or any type of device that may store information, provides instructions 1156a and data 1158a to the processor 1154. A portion of the memory 1174 may also include non-volatile random access memory (NVRAM). Instructions 1156b and data 1158b may also reside in the processor 1154. Instructions 1156b and/or data 1158b loaded into the processor 1154 may also include instructions 1156a and/or data 1158a from memory 1174 that were loaded for execution or processing by the processor 1154. The instructions 1156b may be executed by the processor 1154 to implement the systems and methods disclosed herein.

The user equipment (UE) 1104 may also include a housing that contains a transmitter 1172 and a receiver 1173 to allow transmission and reception of data. The transmitter 1172 and receiver 1173 may be combined into a transceiver 1171. One or more antennas 1199a-n are attached to the housing and electrically coupled to the transceiver 1171.

The various components of the user equipment (UE) 1104 are coupled together by a bus system 1177, which may include a power bus, a control signal bus, and a status signal bus, in addition to a data bus. However, for the sake of clarity, the various buses are illustrated in FIG. 11 as the bus system 1177. The user equipment (UE) 1104 may also include a digital signal processor (DSP) 1175 for use in processing signals. The user equipment (UE) 1104 may also include a communications interface 1176 that provides user access to the functions of the user equipment (UE) 1104. The user equipment (UE) 1104 illustrated in FIG. 11 is a functional block diagram rather than a listing of specific components.

Figure 12:
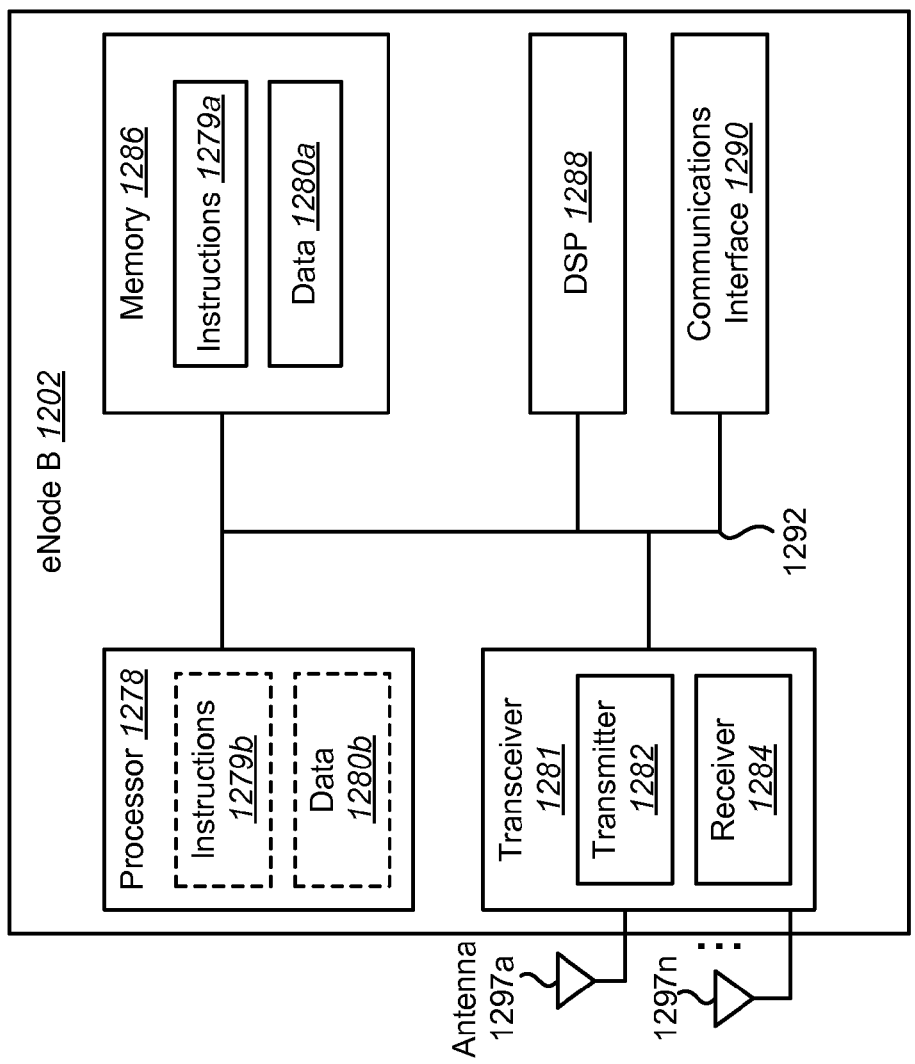
FIG. 12 illustrates various components that may be utilized in an eNode B.

FIG. 12 illustrates various components that may be utilized in an eNode B 1202. The eNode B 1202 may control the points 110 illustrated previously. The eNode B 1202 may include components that are similar to the components discussed above in relation to the user equipment (UE) 1104, including a processor 1278, memory 1286 that provides instructions 1279a and data 1280a to the processor 1278, instructions 1279b and data 1280b that may reside in or be loaded into the processor 1278, a housing that contains a transmitter 1282 and a receiver 1284 (which may be combined into a transceiver 1281), one or more antennas 1297a-n electrically coupled to the transceiver 1281, a bus system 1292, a DSP 1288 for use in processing signals, a communications interface 1290 and so forth.

Unless otherwise noted, the use of '/' above represents the phrase "and/or."

The functions described herein may be implemented in hardware, software, firmware or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. If implemented in hardware, the functions described herein may be implemented in and/or realized using a chipset, an application-specific integrated circuit (ASIC), a large-scale integrated circuit (LSI), an integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for obtaining information related to a cell specific reference signal (CRS) by a user equipment (UE), comprising:
    receiving the CRS;
    receiving a radio resource control (RRC) signaling message from a serving eNode B;
    obtaining information related to frequency resources allocated to an additional CRS and information related to only antenna ports 0-3, which correspond to the additional CRS, from the RRC signaling message.

2. A user equipment (UE) configured for obtaining information related to a cell specific reference signal (CRS), comprising:

a processor; and a memory in electronic communication with the processor; wherein instructions are stored in the memory, the instructions being executable to:

receive the CRS;

receive a radio resource control (RRC) signaling message from a serving eNode B; and obtain information related to frequency resources allocated to an additional CRS and information related to only antenna ports 0-3, which correspond to the additional CRS, from the RRC signaling message.

3. A method for signaling information related to a cell specific reference signal (CRS) by a serving eNode B, comprising:

generating the CRS;

generating a radio resource control (RRC) signaling message that comprises information related to frequency resources allocated to an additional CRS and information related to only antenna ports 0-3, which correspond to the additional CRS; and sending the RRC signaling message to a user equipment (UE).

4. An apparatus configured for signaling information related to a cell specific reference signal (CRS), comprising:

a processor; and a memory in electronic communication with the processor; wherein instructions are stored in the memory, the instructions being executable to:

generate the CRS;

generate a radio resource control (RRC) signaling message that comprises information related to frequency resource allocation of an additional CRS and information related to only antenna ports 0-3, which correspond to the additional CRS; and send the RRC signaling message to a user equipment (UE).

* * * * *